US009758170B2

United States Patent
Fowler et al.

(10) Patent No.: US 9,758,170 B2
(45) Date of Patent: Sep. 12, 2017

(54) COORDINATED CONTROL OF TRANSMISSION AND ACCESSORIES

(71) Applicant: Ford Global Technologies, LLC, Dearborn, MI (US)

(72) Inventors: John G. Fowler, Livonia, MI (US); Joseph F. Kucharski, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/867,239

(22) Filed: Sep. 28, 2015

(65) Prior Publication Data

US 2017/0088139 A1  Mar. 30, 2017

(51) Int. Cl.
*B60W 30/188* (2012.01)
*B60W 10/113* (2012.01)
*B60W 10/30* (2006.01)

(52) U.S. Cl.
CPC ...... *B60W 30/1886* (2013.01); *B60W 10/113* (2013.01); *B60W 10/30* (2013.01); *B60W 30/1888* (2013.01); *B60W 2710/1005* (2013.01)

(58) Field of Classification Search
CPC . B60W 30/1886; B60W 10/113; B60W 10/30
See application file for complete search history.

(56) References Cited

U.S. PATENT DOCUMENTS

| | | | | |
|---|---|---|---|---|
| 4,487,029 A * | 12/1984 | Hidaka | ............... | B60H 1/3222 417/319 |
| 5,582,558 A * | 12/1996 | Palmeri | ................ | B60W 10/06 477/109 |
| 5,711,741 A * | 1/1998 | Inoue | ..................... | F16H 15/38 476/10 |
| 5,730,094 A * | 3/1998 | Morris | .................. | B60W 10/06 123/192.1 |
| 6,314,342 B1 * | 11/2001 | Kramer | ................ | B60W 10/06 180/197 |
| 6,334,424 B1 * | 1/2002 | Ito | ......................... | B60W 10/06 123/295 |
| 8,666,580 B2 | 3/2014 | Hashimoto | | |
| 8,718,854 B2 | 5/2014 | Hashimoto | | |
| 2001/0008131 A1 * | 7/2001 | Ota | ....................... | B60W 10/06 123/339.17 |

(Continued)

FOREIGN PATENT DOCUMENTS

DE  4038301 A1  6/1991

*Primary Examiner* — Dale W Hilgendorf
(74) *Attorney, Agent, or Firm* — James Dottavio; Brooks Kushman P.C.

(57) ABSTRACT

A powertrain includes an engine, a transmission, and one or more accessories, such as an alternator or an air conditioning compressor, all operating based on commands from a controller. The controller is programmed to coordinate commands to the transmission with commands to the accessories to mitigate the impacts of transmission state changes. The accessory drive torque may be adjusted to compensate for the torque required to change the speed of a transmission internal shaft. The accessory effective inertia may be adjusted to maintain a powertrain natural frequency so that active damping can be maintained throughout a transmission state change event.

13 Claims, 4 Drawing Sheets

(56) References Cited

U.S. PATENT DOCUMENTS

| | | | | |
|---|---|---|---|---|
| 2005/0247147 A1* | 11/2005 | Gumpoltsberger | F16H 3/006 | 74/325 |
| 2008/0149442 A1* | 6/2008 | Sturgin | F16H 45/02 | 192/3.26 |
| 2011/0005212 A1* | 1/2011 | Matsushita | F02D 29/02 | 60/299 |
| 2013/0166181 A1* | 6/2013 | Pan | B60W 30/1886 | 701/110 |
| 2013/0325237 A1* | 12/2013 | Ikegami | B60W 10/06 | 701/22 |
| 2014/0291104 A1* | 10/2014 | Boyes | F02B 67/06 | 192/75 |
| 2015/0123624 A1 | 5/2015 | Ookawa et al. | | |

\* cited by examiner

COORDINATED CONTROL OF TRANSMISSION AND ACCESSORIES

TECHNICAL FIELD

The present disclosure relates to vehicle powertrain controls. More particularly, the present disclosure relates to a method of adjusting accessory torque to mitigate the impacts of transmission state changes.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output driving the vehicle wheels, often via a differential assembly which permits the left and right wheel to rotate at slightly different speeds as the vehicle turns.

FIG. 1 schematically illustrates a vehicle powertrain 10. The flow of mechanical power is indicated by thick solid lines whereas dotted lines indicate the flow of control signals. Power is provided by engine 12. Transmission 14 adjusts the speed and torque of the power to suit vehicle needs. Differential 16 divides the power between left and right drive wheels 18 and 20 while permitting slight speed differences as the vehicle turns a corner. Some of the engine power is diverted by front-end accessory drive 22 to drive accessories that are not directly related to propulsion. For example, power may be provided to an alternator 24 to generate electrical power and to an air conditioning compressor 26 to cool the passenger cabin. The engine torque diverted to an accessory such as an alternator or an air conditioning compressor may be called an accessory drive torque. Controller 28 sends signals to the engine, transmission, and the accessories to coordinate their operation. Controller 28 may be a single microprocessor or may be multiple communicating micro-processors.

FIG. 2 schematically illustrates a Dual Clutch Transmission (DCT) 14. Input 30 is adapted for coupling the crankshaft of engine 12, potentially via a damper assembly that reduces the transmission of engine pulsations. Ring gear 32 is fixedly coupled to differential 16. First output pinion 34 is fixedly coupled to first layshaft 36 and meshes with ring gear 32. Second output pinion 38 is fixedly coupled to second layshaft 40 and also meshes with ring gear 32. First friction clutch 42 selectively couples input 30 to solid shaft 44, while second friction clutch 46 selectively couples input 30 to hollow shaft 48 which is concentric with solid shaft 44.

Gears 50 and 52 are supported for rotation about first layshaft 36 and mesh with gears 54 and 56 respectively which are fixedly coupled to solid shaft 44. Coupler 58 selectively couples gear 50 or 52 to first layshaft 36. Gear 60 is supported for rotation about second layshaft 40 and meshes with gear 62 which is fixedly coupled to solid shaft 44. Coupler 68 selectively couples gear 60 to second layshaft 40. When couplers 58 or 68 have coupled one of gears 50, 52, or 60 to the respective layshaft, a power flow path is established between solid shaft 44 and ring gear 32. Each of these different power flow paths is associated with a different speed ratio. When clutch 42 is also engaged, a power flow path is established between input 30 and ring gear 32.

Gears 70 and 72 are supported for rotation about second layshaft 40 and mesh with gears 74 and 76 respectively which are fixedly coupled to hollow shaft 48. Coupler 78 selectively couples gear 70 or 72 to second layshaft 40. Gears 80 and 82 are supported for rotation about first layshaft 36 and mesh with gear 76 and 70 respectively. Coupler 84 selectively couples gear 80 or 82 to first layshaft 36. When couplers 78 or 84 have coupled one of gears 70, 72, 80, or 82 to the respective layshaft, a power flow path is established between hollow shaft 48 and ring gear 32. When clutch 46 is also engaged, a power flow path is established between input 30 and ring gear 32. The speed ratios associated with clutch 46 are interleaved with the speed ratios associated with clutch 42 such that clutch 42 is used to establish odd numbered gear ratios and clutch 46 is used to establish even numbered gear ratios and reverse. A shaft that does not continuously rotate with the transmission input or transmission output, such as shafts 36, 40, 44, 48, may be referred to as internal shafts.

When a driver selects Drive with the vehicle stationary, coupler 58 is commanded to couple gear 52 to shaft 36 while clutch 46 is commanded to disengage. To launch the vehicle, clutch 42 is commanded to gradually engage. Similarly, when Reverse is selected with the vehicle stationary, coupler 84 is commanded couple gear 82 to shaft 36. Then, clutch 46 is commanded to gradually engage to launch the vehicle. When cruising in an odd numbered gear, clutch 42 is engaged. To shift to an even numbered gear, clutch 46 is disengaged (if it was not already disengaged), and either coupler 78 or 84 pre-selects the destination power flow path. After the destination gear is pre-selected, clutch 42 is released and clutch 46 is engaged in a coordinated fashion to transfer power between the corresponding power flow paths and adjust the overall speed ratio.

Clutches 42 and 46 may be either dry or wet friction type clutches. One or more friction plates are fixedly coupled to one of the elements while a housing with a pressure plate and a reaction plate is fixedly coupled to the other element. The friction plates are between the pressure plate and the reaction plate. If there is more than one friction plate, they are separated by separator plates that are also fixedly coupled to the housing. When the clutch is fully disengaged, the reaction plate and the pressure plate are spaced apart such that the friction plate can rotate relative to the housing with minimal drag torque. To engage the clutch, an actuator causes a normal force that squeezes the friction plate(s) between the pressure plate and the reaction plate. The torque capacity of the clutch is proportional to the normal force and also proportional to the coefficient of friction. If the elements are rotating at different speeds, the clutch exerts torque on each element equal to the torque capacity in a direction tending to equalize the speeds. If the elements are at the same speed, then the clutch transfers as much torque as is applied up to the torque capacity. If the applied torque exceeds the torque capacity, then the clutch slips creating relative speed.

SUMMARY

A vehicle includes an engine driven accessory, a transmission, and a controller. The accessory may be an alternator or a variable displacement pump such as an air conditioner compressor. The transmission has first and second gear states with equal speed ratios between an input shaft and an output shaft but different ratios between the input shaft and an internal shaft. For example, the transmission may be a dual clutch transmission and the first and second gear states may be different pre-select states. The controller is programmed to command the transmission to change state and to command the accessory to change its torque to offset the change in speed of the internal shaft. The controller may also change the accessory torque in preparation for commanding the transmission state change.

A vehicle includes an engine driven accessory, a transmission, and a controller. The accessory has variable effective inertia. The transmission has first and second gear states with identical speed ratios but different effective inertias. The controller is programmed to command a transmission state change and command an accessory inertia change such that a powertrain natural frequency remains substantially constant. The controller may also command an accessory inertia change in preparation for commanding the transmission state change. The controller may be further programmed to dampen a vibration at the powertrain natural frequency throughout the transmission state change.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
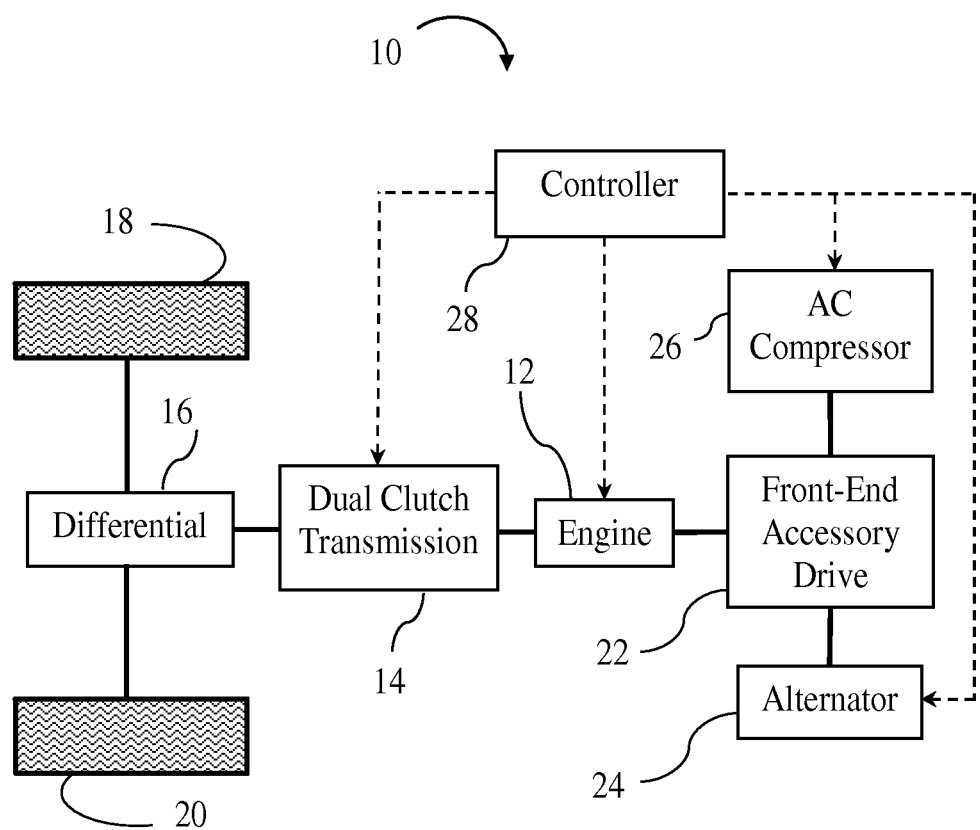
FIG. 1 is a schematic diagram of a vehicle powertrain.
Figure 2:
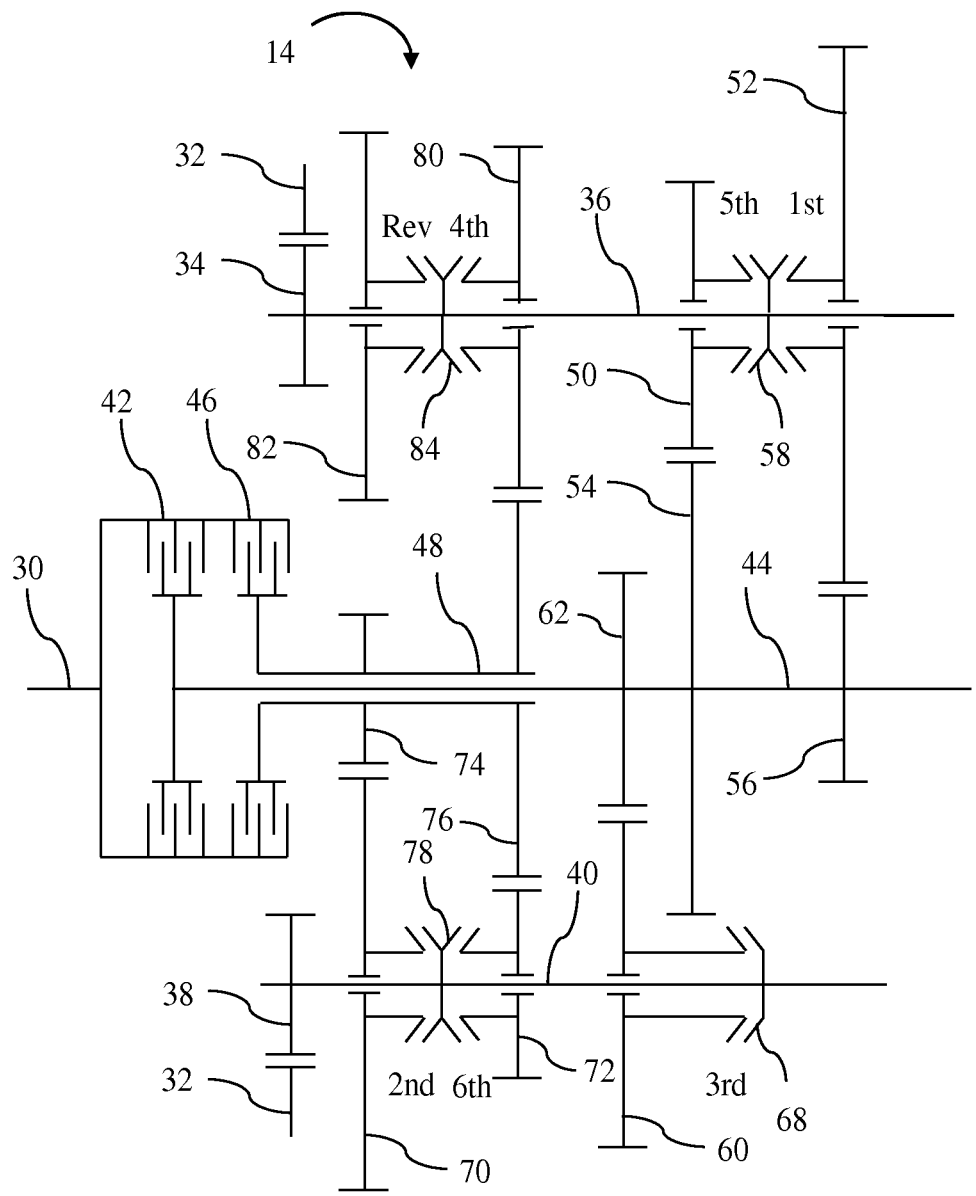
FIG. 2 is a schematic diagram of a dual clutch transmission gearing arrangement.

Referring to the transmission schematic of FIG. 2, the transmission is prepared for launch in a forward direction by sliding coupler 58 to couple gear 52 to shaft 36, thus pre-selecting 1st gear. Then, to start the vehicle moving, the torque capacity of clutch 42 is gradually increased. Couplers 68, 78, and 84 and clutch 46 may be disengaged during this process. Shaft 48 and gears 70, 72, 74, 76, 80, and 82 all tend to remain stationary during this process because they have inertia and no torque acts upon them. In order to prepare for a shift into 2nd gear, gear 70 must be coupled to shaft 40 by sliding coupler 78. Coupler 78 may be a synchronizer device that includes a blocker ring. The blocker ring rotates with shaft 40. A sleeve exerts axial force on inclined surfaces of the blocker ring to push the blocker ring toward gear 70. The blocker ring, in turn, transmits the axial force to gear 70 through a friction surface. This axial force results in a frictional torque tending to accelerate gear 70 toward the same speed as shaft 40 and the blocker ring. The torque on the blocker ring is transmitted back to the sleeve through the inclined surface, which resist the axial force. The angle of the inclined surfaces is set such that the increasing the axial force increases the resisting force to prevent further axial movement of the sleeve. When gear 70 reaches the same speed as shaft 40, the torque suddenly drops. This drop in torque, in term, reduces the resisting force such that the sleeve can move further and engage dog teeth to positively couple gear 70 to shaft 40.

Of course, for gear 70 to accelerate to the speed of shaft 40, many other components must also accelerate. Since gear 70 meshes with gear 74 and 82, they must accelerate in proportion. Since the gear 74 is fixedly coupled to hollow shaft 48, shaft 48 and all components that are fixedly coupled to it, including the disk of clutch 46, must accelerate. Accelerating these components requires torque. Some of the power transmitted to ring gear 32 through the 1st gear power flow path must be diverted to shaft 40 to accelerate the components as opposed to being transmitted to the differential to propel the vehicle. If the power from the engine is constant, the torque transmitted to the vehicle wheels decreases suddenly when the pre-select operation starts and then increases suddenly when the pre-select event ends. These changes in propulsive torque may be noticeable by vehicle occupants, who may find them annoying. Notice that the speed ratio between the transmission input and the transmission output (ring gear 32) does not change during a pre-selection event. However, the speeds of one or more internal shafts, relative to the transmission output and the transmission input, do change.

In some circumstances, it may be possible to accelerate the necessary components for a pre-selection event using the friction clutch. In the circumstance described above, for example, the clutch disk of clutch 46 must accelerate from near zero speed to a speed less than the speed of the clutch housing. Therefore, clutch 46 may be used to accelerate these components in the correct direction. (In some circumstances, the friction clutch would not accelerate the components in the desired direction.) Unlike a synchronizer with a blocker ring, there is no passive mechanism to stop the acceleration when the components reach the synchronized speed. Therefore, the clutch torque capacity must be actively controlled based on speed measurement feedback. Using one of the friction clutches 42 and 46 in this way is called a Clutch Before Synchronization (CBS) event. CBS events, like synchronization events using a synchronizer, may result in sudden changes in propulsive torque at the wheels which can annoy vehicle occupants.

To mitigate these output torque variations, the input torque may be varied to compensate for the power diverted to overcome component inertia. However, internal combustion engine 12 may not be capable of changing its torque output sufficiently rapidly to compensate for these events. Some accessories, such as alternator 24 and/or AC compressor 26 may be capable of rapidly changing the accessory drive torque that they impose on engine 12. If the load imposed by an accessory is reduced as the pre-select event starts and then increased as the pre-select events ends, the output torque remains nearly constant. For some pre-select events, components must slow down as opposed to speeding up. For these events, the accessory load would be increased as the pre-select event begins and decreased as the pre-select event ends.

Figure 3:
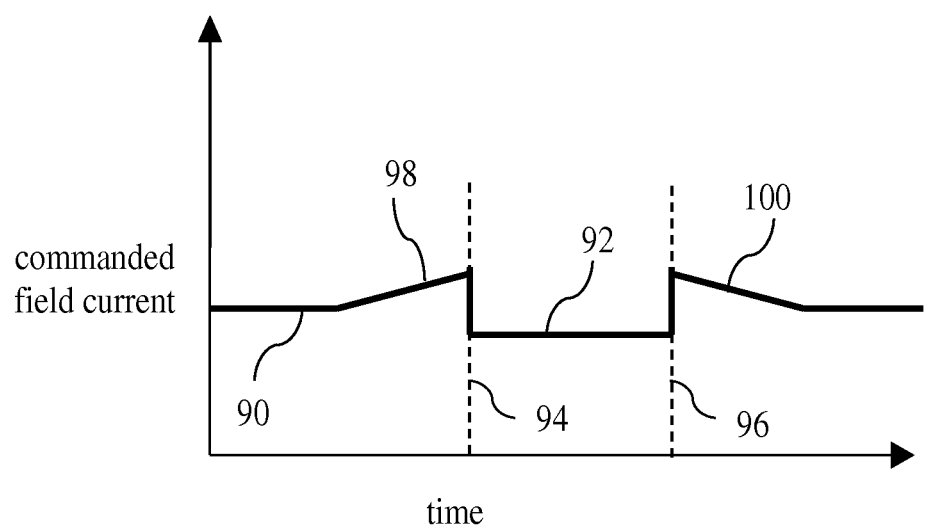
FIG. 3 is a graph illustrating the variation of alternator field current to compensate for a pre-select state change in the dual clutch transmission of FIG. 2.

Variation of alternator load to mitigate a pre-select torque disturbance is illustrated in FIG. 3. An alternator is typically controlled by setting a field current to achieve a nominal bus voltage as shown at 90. The load can be decreased by commanding a lower field current 92 between the time the pre-select event begins at 94 and the time the pre-select events at 96. To avoid excessive variation in bus voltage, a capacitor may be added to the bus to stabilize the voltage. To further reduce the variation the controller may prepare for the pre-select event by gradually increasing the field current before the pre-select event at 98 and gradually reducing the field current after the event at 100 such that the average field current is equal to the current required for the nominal bus voltage. Since the variations in torque at 98 and 100 are gradual, vehicle occupants are unlikely to notice.

The accessory drive torque of an AC compressor is dependent upon the displacement of the compressor. When an AC compressor has a variable displacement, the controller can command the displacement in a similar fashion to that illustrated in FIG. 3 for field current of an alternator. Varying the displacement of an AC compressor, or other variable displacement engine driven pump, may provide a greater range of accessory drive torque adjustment than varying the field current of an alternator. The air temperature change due to a short-term adjustment in AC compressor displacement will not be noticeable to vehicle occupants.

The natural frequency of a powertrain system changes depending upon the state of engagement of clutches and couplers. The system may have one natural frequency when a particular clutch is fully released, a second natural frequency when the clutch is slipping, and a third natural frequency when the clutch is fully engaged. Similarly, the natural frequency may change when a coupler is engaged or released during a pre-selection event. Any sudden change of shaft torque may start an oscillation at a powertrain natural frequency. One technique used to mitigate powertrain oscillations is active damping. A controller measures an oscillating speed or torque and commands an actuator to exert an oscillating torque at the same frequency with a phase difference such that the commanded torque reduces the oscillation. The actuator may be, for example, a slipping clutch or an alternator field current. One limitation of this active damping technique is that the frequency of the oscillation must be constant. If the natural frequency of the powertrain changes abruptly, the active damping must be suspended until the controller can re-adjust to the new frequency.

In some instances, the change in natural frequency may be avoided by commanding a compensating change in the displacement of the AC compressor or other engine driven variable displacement pump. Since the fluid being pumped has mass, there is an equivalent rotational moment of inertia at the pump. The equivalent rotational moment of inertia is proportional to the pump displacement per revolution. Varying the pump displacement, therefore, varies the system natural frequency. In some cases, the controller may be able to compute a change in the pump displacement that impacts the natural frequency by the same amount as the change in pre-select state, but in the opposite direction. By commanding the displacement to change by this amount at the same time that the pre-select state change occurs, the natural frequency remains constant and active damping can continue uninterrupted throughout the event.

Figure 4:
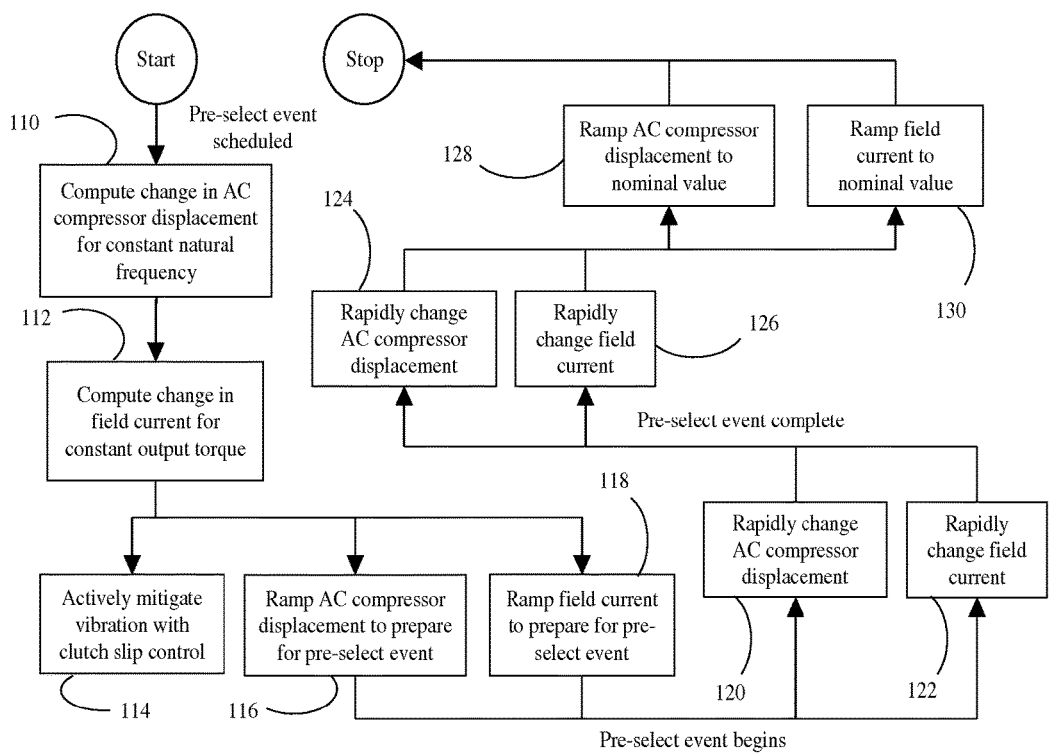
FIG. 4 is a flow chart of a method to adjust alternator field current and AC compressor displacement to mitigate transmission state changes.

FIG. 4 is a flow chart illustrating a process that uses a combination of AC compressor displacement change and alternator field current change to avoid sudden changes in powertrain natural frequency and output torque. Various aspects of this method may be used in isolation without implementing all aspects. The process begins when a pre-select event is scheduled. At 110, the controller calculates the amount that the AC compressor displacement must be changed in order to maintain a constant natural frequency. This may include an amount that it must be changed at the beginning of the pre-select event and the amount that it must be changed at the end of the pre-select event. The amounts for various pre-select events may be computed or measured in advance such that these amounts may be calculated by the controller at 110 using a table look-up. At 112, the controller calculates the amount that the field current must be changed at the beginning of the pre-select event and at the end of the pre-select event in order to maintain a constant output torque. The amount includes compensation for the torque that is diverted to overcoming inertia and also the amount that compensates for the AC displacement changes calculated at 110. At 114, active damping control using a slipping clutch is initiated if it was not already occurring. Active damping control continues throughout the remaining steps. At 116 and 118, the controller may command a gradual change in AC compressor displacement and field current in preparation for the changes calculated at 110 and 112 respectively. For example, if the AC compressor torque is to be reduced to maintain the natural frequency, it may be gradually increased at 116 to make room for the reduction. Because the changes are gradual, the vehicle occupants do not notice and active damping control may continue. When the pre-select event actually begins, via coupler actuation, coupler release, or a CBS event, the changes calculated at 110 and 112 are executed at 120 and 122 respectively. When the event completes, do to coupler engagement, disengagement, or completion of the CBS event, the commands are changed at 124 and 126 by the second amounts calculated at 110 and 112 respectively. Then, at 128 and 130, the AC compressor command and the field current command are gradually returned to their nominal values.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
commanding a dual clutch transmission to change from a first gear state to a second gear state by changing the state of a synchronizer, wherein the first and second gear states have an identical speed ratio between an input shaft and an output shaft and wherein a speed ratio between the input shaft and an internal shaft differs between the gear states; and
commanding a change in an accessory drive torque such that a torque required to change a speed of the internal shaft is offset.

2. The method of claim 1 further comprising commanding a preparatory change in the accessory drive torque before commanding the transmission to change from the first to the second gear state.

3. The method of claim 1 wherein the accessory drive torque is changed by changing a field current of an alternator.

4. The method of claim 1 wherein the accessory drive torque is changed by changing a displacement of a pump.

5. The method of claim 4 wherein the pump is an air conditioning compressor.

6. A method comprising:
commanding a transmission to transition from a first gear state to a second gear state having an identical transmission speed ratio; and
commanding a moment of inertia change in an engine driven accessory such that a powertrain natural frequency in the second gear state is substantially equal to a powertrain natural frequency in the first gear state.

7. The method of claim 6 further comprising commanding a preparatory change in the accessory moment of inertia in preparation for commanding the transmission to change from the first to the second gear state.

8. The method of claim 6 further comprising actively dampening a vibration throughout the change from the first to the second gear state.

9. The method of claim 8 wherein dampening the vibration is done by controlling a torque capacity of a slipping clutch.

10. The method of claim 6 wherein the engine driven accessory is a variable displacement pump.

11. The method of claim 10 wherein the variable displacement pump is an air conditioning compressor.

12. A method of controlling a vehicle, the vehicle having a variable displacement air conditioning compressor, and a dual clutch transmission, the method comprising:
commanding the transmission to change a pre-select state; and
commanding a change in an air conditioning compressor displacement to offset a moment of inertia change associated with the change in the pre-select state to maintain a substantially constant powertrain natural frequency.

13. The method of claim 12 further comprising actively dampening a vibration throughout the change of the pre-select state.

* * * * *